June 25, 1963     D. B. CRAWFORD     3,095,274
HYDROGEN LIQUEFACTION AND CONVERSION SYSTEMS
Filed July 1, 1958     2 Sheets-Sheet 1
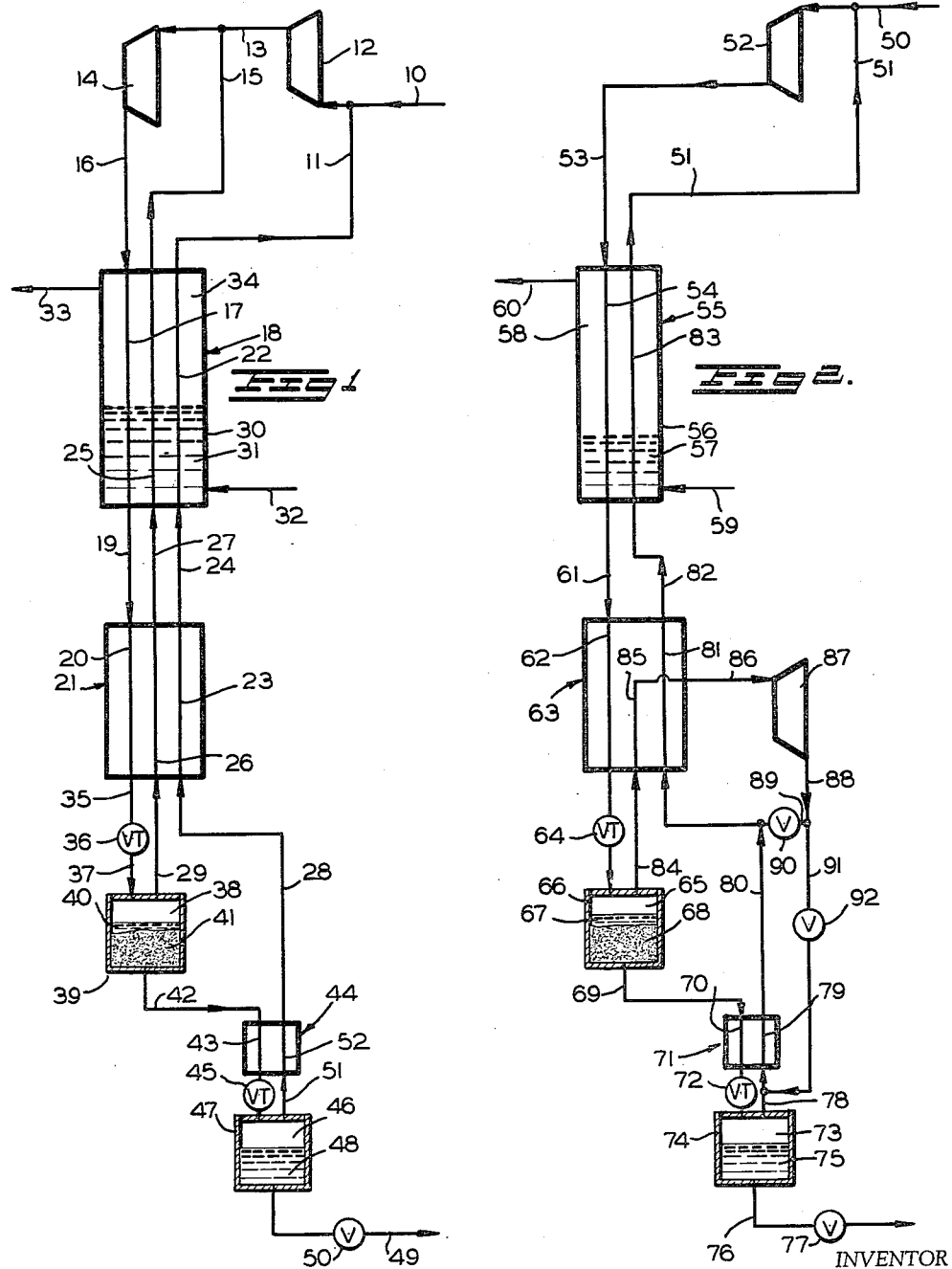
INVENTOR
DUFFER B. CRAWFORD
BY Shanley & O'Neil
ATTORNEYS June 25, 1963  D. B. CRAWFORD  3,095,274
HYDROGEN LIQUEFACTION AND CONVERSION SYSTEMS
Filed July 1, 1958  2 Sheets-Sheet 2
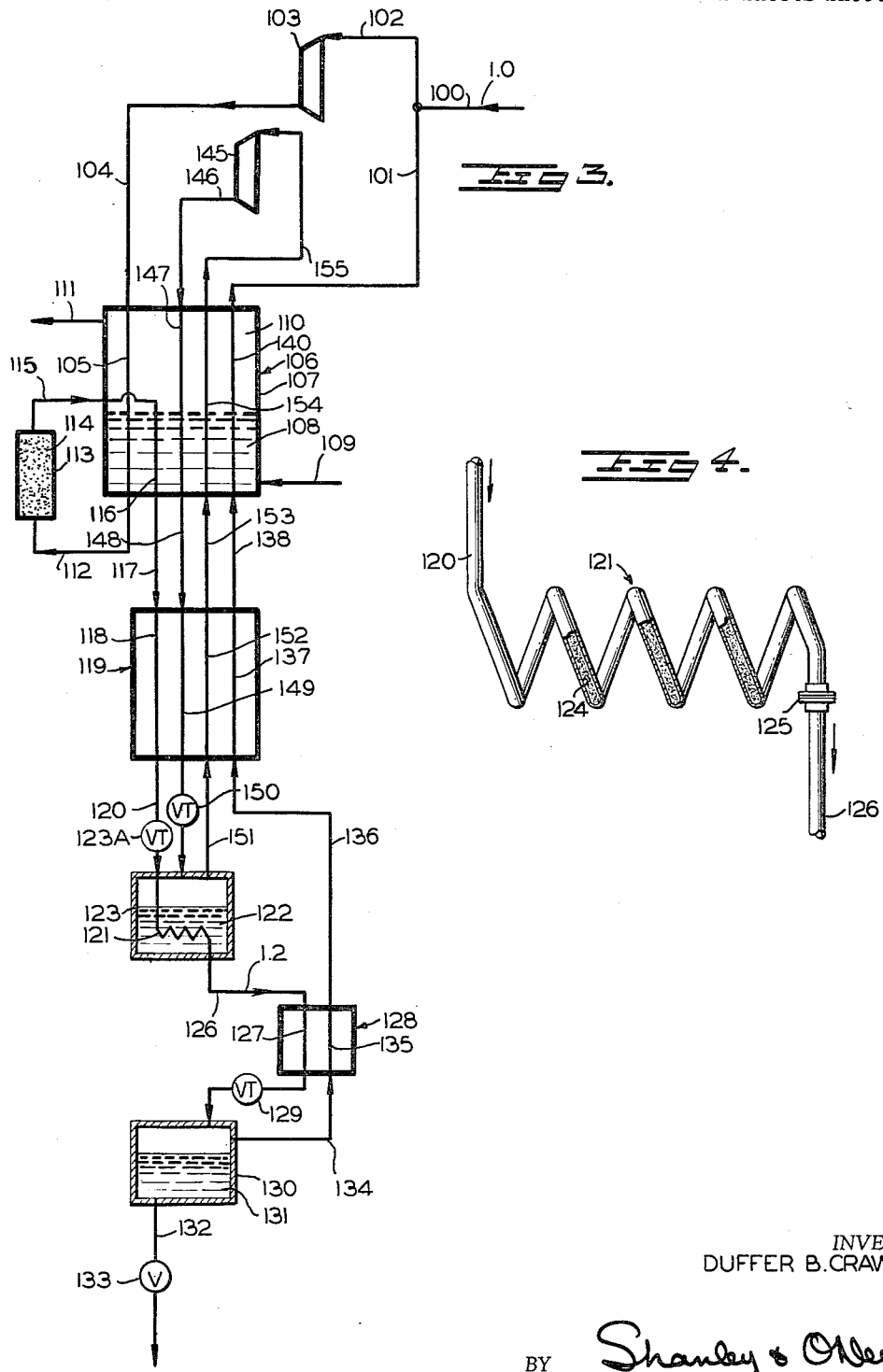
INVENTOR
DUFFER B. CRAWFORD
BY Shanley & O'Neil
ATTORNEYS

3,095,274
HYDROGEN LIQUEFACTION AND CONVERSION SYSTEMS

Duffer B. Crawford, Allentown, Pa., assignor, by mesne assignments, to Air Products and Chemicals, Inc., Trexlertown, Pa., a corporation of Delaware
Filed July 1, 1958, Ser. No. 746,050
24 Claims. (Cl. 23—210)

This invention relates to the liquefaction of hydrogen and more particularly to a novel method of and apparatus for producing liquid hydrogen of high para composition.

It is known that normal hydrogen is a mixture of two gases referred to as ortho hydrogen and para hydrogen, and that the equilibrium concentration of ortho hydrogen and para hydrogen varies with temperature. At temperatures above about −100° F. normal hydrogen exists, that is hydrogen having an equilibrium composition of 75% ortho hydrogen and 25% para hydrogen, while at lower temperatures the eqilibrium composition is such that concentrations of para hydrogen increase with decrease in temperature, the para hydrogen concentration gradually increasing from about 25% to about 38% as the temperature decreases from about −100° F. to about −280° F. and then rapidly increases to about 100% para hydrogen as the temperature further decreases to the boiling point of hydrogen at atmospheric pressure. Thus, liquefied normal hydrogen under atmospheric pressure, as produced by conventional hydrogen liquefiers, undergoes autogeneous conversion of ortho hydrogen to para hydrogen until an equilibrium composition of about 100% para hydrogen is established. It is also known that ortho hydrogen conversion is an exothermic reaction, releasing about 457 B.t.u./lb. mol upon conversion of ortho hydrogen to 100% para hydrogen and that autogenous conversion of ortho hydrogen to para hydrogen is not instantaneous but requires an appreciable time interval for its completion. Since the heat of ortho hydrogen conversion is greater than the heat of vaporization of hydrogen at atmospheric pressure, liquid hydrogen will continuously evaporate until 100% para hydrogen composition is reached. The percentage of liquid hydrogen that is lost by vaporization is a function of the ortho hydrogen composition of the liquid hydrogen at the time ortho hydrogen conversion begins, such as the time liquid hydrogen is introduced into a storage vessel, and a function of the degree of completeness of conversion of ortho hydrogen to para hydrogen, that is, the storage period. It has been determined that when liquefied normal hydrogen is stored in an insulated vessel under atmospheric pressure after about eight days autogenous conversion of ortho hydrogen to para hydrogen results in such a loss of liquid that only about 50% of the initially stored liquid hydrogen remains. Thus it is not practicable to store liquefied normal hydrogen.

It has been proposed in the past to accelerate conversion of ortho hydrogen to para hydrogen by the use of a catalyst placed in the liquid receiving zone of a hydrogen liquefier in intimate contact with liquefied hydrogen under atmospheric pressure. With this arrangement, it is possible to produce liquid hydrogen of high para concentration which may be stored at atmospheric pressure without appreciable liquid loss. However, there is no saving in power since the power required to produce a given quantity of liquid hydrogen of high para concentration by catalytic conversion at atmospheric pressure is substantially the same as the power required to produce the same quantity of liquid hydrogen of similar para hydrogen concentration when autogenous ortho hydrogen conversion takes place.

It is therefore an object of the present invention to provide a novel method of and apparatus for producing liquid hydrogen of high para concentration.

Another object is to provide a novel method of and apparatus for producing liquid hydrogen of a high para concentration in which the power required per mol of product is materially less than the power requirements of prior cycles.

Still another object of the present invention is to provide a novel method of and apparatus for producing liquid hydrogen of a para concentration of the order of 85%–97% or greater with a total expenditure of power per mol of product being substantially 20% less than the power requirements of prior cycles.

In accordance with the principles of the present invention liquid hydrogen is subjected to catalytic treatment to effect conversion of ortho hydrogen to para hydrogen under novel conditions such that the inherent heat of conversion is utilized to produce a fluid possessing high internal energy and the internal energy of the fluid is used to reduce the power required to produce the liquid hydrogen. In particular, in the method and apparatus provided by the present invention catalytic conversion of ortho hydrogen to para hydrogen is accomplished in such a manner so that the heat of conversion vaporizes liquefied gas under superatmospheric pressure, the liquefied gas being at a temperature corresponding to the desired para hydrogen concentration and the vaporized liquefied gas being under superatmospheric pressure possesses high internal energy which is utilized to materially reduce hydrogen liquefaction power requirements notwithstanding the relationship of pressure and heat of vaporization.

The feature provided by the present invention of catalytically converting ortho hydrogen to para hydrogen under conditions such that the heat of conversion effects varporization of a liquefied gas under superatmospheric pressure lends to the utilization of a liquefaction cycle of the type employing a recirculated refrigeration fluid under superatmospheric pressure. Refrigeration fluid is compressed, cooled and expanded to a superatmospheric pressure and partially liquefied and hydrogen feed is converted catalytically to effect vaporization of liquefied refrigeration fluid. Refrigeration fluid may comprise hydrogen gas or a gas other than hydrogen, and the hydrogen feed and the refrigeration fluid may flow through the cycle as separate streams with the hydrogen feed being under any desired pressure when catalytically treated to accelerate conversion of ortho hydrogen to para hydrogen. Also, hydrogen feed and refrigeration fluid may comprise a common stream of compressed hydrogen gas which is expanded to a superatmospheric pressure and introduced into a catalytic treating zone with the hydrogen feed in liquid phase and the refrigeration fluid partly liquefied, the liquid hydrogen feed being catalytically converted and the heat of conversion vaporizing liquefied refrigeration fluid.

As discussed above, the hydrogen feed may be catalytically converted at any desired pressure, such as atmospheric pressure or a relatively high superatmospheric pressure or at any intermediate pressure including the superatmospheric pressure of the liquefied gas vaporized by the heat of conversion. In cycles in which the hydrogen feed is under a superatmospheric pressure during the catalytic conversion process, the converted hydrogen may be expanded to a lower pressure, such as atmospheric pressure, and hydrogen vapor flashed during this expansion may be recirculated in the cycle. The hydrogen feed may be catalytically converted while in liquid phase or while under a pressure above the critical pressure of hydrogen.

The foregoing and other objects and features of the present invention will appear more fully from the following detailed description considered in connection with the accompanying drawings which disclose several embodiments of the invention. It is to be expressly understood however that the drawings are designed for purposes of illustration only and not as a definition of the limits of the invention, reference for the latter purpose being had to the appended claims.

In the drawings:

FIGURE 1 is a diagrammatic showing of a hydrogen liquefaction and conversion cycle constructed in accordance with the present invention;

FIG. 2 is a diagrammatic illustration of a hydrogen liquefaction and conversion cycle constructed in accordance with another embodiment of the present invention;

FIG. 3 is a diagrammatic showing of a hydrogen liquefaction and conversion cycle according to another embodiment of the present invention, and FIG. 4 is a detailed view illustrating a portion of the cycle shown in FIGURE 3.

In FIGURE 1 of the drawings a hydrogen liquefaction and conversion cycle embodying the principles of the present invention is disclosed therein with a stream of normal hydrogen at atmospheric temperature and pressure and free of moisture and other condensibles including oxygen and nitrogen being fed thereto through conduit 10 and merged with a stream of gaseous hydrogen of high para concentration at substantially atmospheric temperature and pressure in conduit 11, the gaseous hydrogen stream of high para concentration being derived from the process in a manner described below. The merged streams are passed to a first stage compressor 12 by which the pressure is increased to a superatmospheric pressure below the critical pressure of hydrogen which may be referred to as an intermediate pressure. The hydrogen stream under intermediate pressure is conducted by conduit 13 to the inlet of a second stage compressor 14 together with a stream of gaseous hydrogen under the intermediate pressure passed by conduit 15 connected to the conduit 13, the stream of gaseous hydrogen in the conduit 15 having a para composition greater than normal and being derived from the liquefaction and conversion process as described below. The stream of hydrogen gas fed to the compressor 14 from the conduits 10, 11 and 15 is compressed to a relatively high pressure as required for partial liquefaction described below and comprises the hydrogen feed as well as a refrigeration fluid of the cycle. The high pressure hydrogen gas is cooled to a relatively low temperature by warming the gaseous hydrogen streams passed by conduits 11 and 15 and extraneous refrigeration may also be employed. As shown, the high pressure hydrogen gas is conducted by conduit 16 to pass 17 of a multi-pass heat exchange device 18 and from the cold end of the pass 17 through conduit 19 to pass 20 of a multi-stage heat exchange device 21. The heat exchange devices 18 and 21 include passes 22 and 23, respectively, connected in series by conduit 24, and passes 25 and 26, respectively, connected in series by conduit 27, through which relatively cold gaseous hydrogen streams at atmospheric pressure and at the intermediate pressure, respectively, flow in countercurrent heat exchange effecting relation with the high pressure hydrogen gas. The conduits 11 and 15 are respectively connected to the warm ends of the passes 22 and 25 of the heat exchange device 18 and cold gaseous hydrogen at atmospheric pressure and at the intermediate pressure are respectively fed by conduits 28 and 29 to passes 23 and 26 at the cold end of the heat exchange device 21. The heat exchange device 18 may include a shell 30 defining a chamber enclosing the heat exchange passes 17, 22 and 25 and may include a liquid receiving zone containing a pool of liquid refrigerant 31 fed thereto by way of a conduit 32 from a source, not shown, and having a connection through conduit 33 to a vapor zone 34 within the chamber. If desired, the conduit 33 may be connected to a region of subatmospheric pressure.

Cooled high pressure hydrogen is withdrawn from the pass 20 at the cold end of the heat exchange device 21 and conducted by a conduit 35 to an expansion valve 36 by which its pressure is reduced to an intermediate superatmospheric pressure, the effluent of the expansion step being introduced by conduit 37 into a chamber 38 defined by vessel 39. The temperature and pressure conditions existing downstream of the expansion valve 36 are such that a portion of the hydrogen entering the chamber 38 is in liquid phase, the liquefied hydrogen collecting in a pool 40.

In accordance with the principles of the present invention a catalyst 41, of the type capable of accelerating conversion of ortho hydrogen to para hydrogen, is located within the chamber 38 in intimate contact with the liquid hydrogen collecting in the pool 40. The catalyst 41 may comprise a mass or bed of small particles of any one of a number of known materials capable of accelerating conversion of ortho hydrogen, such as ferric hydroxide, for example. Catalytically converted hydrogen in liquid phase is withdrawn from the chamber 38 by way of a conduit 42, conducted through pass 43 of heat exchange device 44 in countercurrent heat exchange effecting relation with a cold fluid stream described below, expanded in a valve 45 to atmospheric pressure and introduced into a liquid receiving chamber 46 defined by vessel 47 which may comprise a storage vessel. Converted liquid hydrogen of high para concentration collects in a pool 48 from which it may be withdrawn through conduit 49 provided with a control valve 50. Hydrogen vapor flashed upon expansion of catalytically converted liquid hydrogen from the intermediate supertamospheric pressure to atmospheric pressure is withdrawn from the chamber 46 through conduit 51, and then conducted through pass 52 of heat exchange device 44 in countercurrent heat exchange effecting relation with the intermediate pressure liquid hydrogen. This heat exchange step reduces the percentage of converted hydrogen flashed upon expansion in valve 45 and obtains up to 5% saving in power. Hydrogen vapor is then passed by conduit 28 through heat exchange devices 21 and 18, in countercurrent heat exchange effecting relation with the high pressure hydrogen gas as described above. The unliquefied portion of the hydrogen gas at the intermediate pressure and liquefied hydrogen vaporized by the heat of conversion, which together comprise the refrigeration fluid, are withdrawn from the chamber 38 through the conduit 29 and then flowed through pass 26 of heat exchange device 21 and pass 25 of heat exchange device 18 as described above.

In operation of a cycle embodying the principles of the present invention as shown in FIGURE 1 of the drawings a stream of normal hydrogen, that is, 25% para hydrogen and 75% ortho hydrogen, free of moisture and other impurities and condensibles, enters the cycle through conduit 10 at substantially atmospheric temperature and pressure. The stream of normal hydrogen is mixed with a stream of hydrogen vapor under atmospheric pressure in conduit 11 and the combined streams are compressed in compressor 12 to an intermediate pressure of 80 p.s.i.a. for example. Compressed hydrogen from the compressor 12 and refrigeration fluid comprising gaseous hydrogen under the intermediate pressure in conduit 15 are compressed in the compressor 14 to a high pressure of about 1500 p.s.i.a., for example. The stream of high pressure hydrogen gas enters the pass 17 of the heat exchange device 18 at about 80° F. and is cooled while flowing therethrough to about —343° F., the refrigerant in the pool 31 being liquid nitrogen boiling under a pressure of about 2 p.s.i.a. The high pressure hydrogen is further cooled to about —387° F. upon flowing through the heat exchange device 21 and is then expanded to about 80 p.s.i.a. in the valve 36 and further cooled to about —410° F. with about 30%, for example, of the hydrogen being in liquid phase. At an intermediate pressure of 80 p.s.i.a. the temperature of the liquid hydrogen in the pool 40 is about —410° F. and the catalyst 41 effects accelerated conversion of ortho hydrogen to establish an equilibrium composition as high as 97% para hydrogen depending upon the catalytic efficiency as discussed below. The heat of conversion results in vaporization of about 50% of the liquid hydrogen in the vessel 39. About 17% of the hydrogen entering the vessel 39, comprising the hydrogen feed, is withdrawn from the chamber 38 by conduit 42 as liquid hydrogen of high para concentration. The catalytically converted liquid hydrogen is cooled upon flowing through the heat exchange device 44, further cooled to about —422° F. upon expansion in valve 45 to atmospheric pressure and then introduced into the liquid receiving chamber 46. Liquid collecting in the pool 48 tends to undergo further ortho hydrogen conversion to establish an equilibrium composition of about 100% para hydrogen corresponding to the existing temperature of about —422° F. However the exact para hydrogen concentration of the liquid in pool 48 will depend upon the residence time in the chamber 46. Upon expansion of the converted liquid hydrogen from the intermediate pressure of 80 p.s.i.a. to atmospheric pressure approximately 15% of the converted liquid flashes as vapor of high para hydrogen and such vapor is warmed to about —345° F. upon flowing through heat exchange passes 52 and 23 and is then further warmed to about 70° F. in pass 22 of heat exchange device 18 at which temperature the stream is fed to the inlet of compressor 12.

The refrigeration fluid being about 83% of the hydrogen gas and comprising unliquefied hydrogen gas and liquefied hydrogen gas vaporized by the heat of conversion, is withdrawn from the chamber 38 and warmed to about 70° F. upon flowing successively through passes 26 and 25 of heat exchange devices 21 and 18 in countercurrent heat exchange effecting relation with the incoming high pressure hydrogen gas. The refrigeration fluid at the intermediate pressure leaves the warm end of the heat exchange device 21 at about —345° F. and is fed to the inlet of the compressor 14 at about 70° F. for subsequent recompression to the high pressure as described above. The unliquefied hydrogen portion of the refrigeration fluid may comprise about 66% of the high pressure hydrogen gas entering the chamber 38 while the remaining part of the refrigeration fluid, i.e., liquefied hydrogen vaporized by the heat of conversion, may comprise about 17% of the high pressure hydrogen gas.

With the cycle of FIGURE 1 operating in the manner described above, in order to produce 1 mol of liquid hydrogen of a para composition of the order of 97% for example, it is necessary to withdraw about 1.2 mols of liquid hydrogen from the vessel 39 since about 15% of the withdrawn liquid flashes in vapor upon expansion to atmospheric pressure in valve 45. In order to liquefy the hydrogen feed at the intermediate pressure of 80 p.s.i.a. and to partly liquefy the refrigeration fluid at the intermediate pressure to provide liquid hydrogen for vaporization by the heat of conversion, about 6.4 mols of refrigeration fluid is required to be circulated in the cycle, that is, about 6.4 mols of hydrogen vapor at the intermediate pressure is withdrawn from chamber 38 through conduit 29, warmed to about 70° F. in heat exchange passes 26 and 25, compressed to about 1500 p.s.i.a. in compressor 14, cooled in heat exchange passes 17 and 20 and expanded to about 80 p.s.i.a. in valve 36. Thus, 7.6 mols of high pressure hydrogen gas is delivered from the compressor 14. The feed to the compressor 14 comprises 6.4 mols of gaseous hydrogen (the refrigeration fluid) and 1.2 mols of gaseous hydrogen delivered by the compressor 12 and the feed to the latter compressor comprises 1 mol of normal hydrogen gas introduced by conduit 10 and .2 mol of hydrogen vapor of high para concentration delivered by conduit 11. It is seen from the foregoing that about 7.6 mols of hydrogen gas is required to be compressed to about 1500 p.s.i.a. to produce 1 mol of liquid hydrogen of at least 97% para concentration with about 6.4 mols of hydrogen gas, being compressed from 80 p.s.i.a. and the remaining 1.2 mols, being compressed from atmospheric pressure.

As discussed above, conversion of ortho hydrogen to para hydrogen is an exothermic reaction releasing about 457 B.t.u. upon conversion of one pound mol of normal hydrogen at atmospheric pressure. In view of the rapid decrease of the latent heat of vaporization of liquid hydrogen from about 380 B.t.u./lb. mol at atmospheric pressure to zero at the critical pressure of 188 p.s.i.a., it would appear to be disadvantageous to effect catalytic conversion at superatmospheric presures. This is manifest by considering the quantity of liquid hydrogen vaporized at atmospheric pressure and at various superatmospheric pressures upon conversion of one pound mol of liquid hydrogen as shown in the following table:

| Pressure, p.s.i.a. | Heat of vaporization, B.t.u./ lb. mol | Lb. mol of vapor per lb. mol of converted liquid |
|---|---|---|
| 20 | 380 | 1.19 |
| 60 | 340 | 1.33 |
| 80 | 310 | 1.46 |
| 100 | 280 | 1.6 |
| 130 | 240 | 1.89 |
| 150 | 190 | 2.38 |

Notwithstanding the increasing vaporization of liquid hydrogen per mol of converted liquid hydrogen with increasing conversion pressures, total power and investment savings up to 20%, as compared to the prior cycles, may be obtained by practicing the principles of the present invention.

While a saving in power is obtained by catalytically converting ortho hydrogen to para hydrogen at any intermediate superatmospheric pressure below the critical pressure of hydrogen, it has been determined that substantial power savings may be realized when effecting the catalytic conversion at intermediate pressures between 60 p.s.i.a. and 130 p.s.i.a. and that under certain conditions the preferred catalytic conversion pressure falls within the limits of 80 p.s.i.a. and 110 p.s.i.a. Although the percentage of converted liquid hydrogen that flashes into vapor upon expansion from the superatmospheric conversion pressure to atmospheric pressure increases as the conversion pressure is raised up to the critical pressure of hydrogen, it has been determined that the power required to produce 1 mol of liquid para hydrogen decreases as the conversion pressure increases above atmospheric pressure. A plot of power requirements against superatmospheric conversion pressures does not define a straight line relationship throughout a range of conversion pressures between atmospheric pressure and the critical pressure of hydrogen, but demonstrates that the power required to produce 1 mol of liquid para hydrogen rapidly decreases as the conversion pressure increases from atmospheric pressure to a pressure in the neighborhood of 60 p.s.i.a. and then gradually decreases as the conversion pressure increases to about 130 p.s.i.a. At conversion pressures between 130 p.s.i.a. and 180 p.s.i.a. power required to produce 1 mol of liquid para hydrogen only slightly decreases. At a conversion pressure of about 60 p.s.i.a. approximately 50% of the possible power saving may be realized and the power saving increases with further increases in the conversion pressure approaching practical power saving at about 130 p.s.i.a. which comprises a practical operating pressure. It is believed the possible power saving varies in the foregoing manner due to variations in the percentage of converted liquid flashed upon its expansion from the conversion pressure to atmospheric pressure and also due to changes with pressure of the density of liquid and gaseous hydrogen.

The percentage of converted liquid hydrogen flashed as vapor upon expansion from the superatmospheric conversion pressure to atmospheric pressure increases according to a substantially straight line function up to conversion pressures in the neighborhood of about 130 p.s.i.a., and rapidly increases reaching a maximum at the critical pressure of hydrogen. Also, the density of hydrogen vapor gradually increases with pressure while the density of hydrogen liquid gradually decreases with pressure, from atmospheric pressure to about 130 p.s.i.a., and at pressures above 130 p.s.i.a. the densities change more rapidly approaching equality at the critical pressure of hydrogen. Since the difference in density between hydrogen liquid and hydrogen vapor determines the driving force for separating the phases it is believed that at conversion pressures above 130 p.s.i.a. the decreasing density difference is an influencing factor establishing pressure of about 130 p.s.i.a. as the practical operational conversion pressure. Furthermore, the conversion pressure determines the para equilibrium concentration of the converted liquid hydrogen. At a conversion pressure of about 130 p.s.i.a. liquid hydrogen will be converted at a temperature of about −403° F. and it will be possible to establish a para hydrogen concentration as high as about 95%. At a conversion pressure of 60 p.s.i.a. maximum para hydrogen equilibrium concentration of about 98% corresponding to about −412° F. may be obtained. For reasons discussed below, it is not economically feasible to obtain para hydrogen concentrations higher than 98% and in view of the fact that the power requirements increase rapidly at conversion pressures below 60 p.s.i.a., the latter pressure is believed to define the low pressure of the optimum range of superatmospheric conversion pressures. At conversion pressures of 80 p.s.i.a. to 110 p.s.i.a. it is possible to obtain converted hydrogen of about 96% to 97% para concentration. This is satisfactory para concentration for most storage requirements.

The liquefaction and conversion cycle shown in FIGURE 2 of the drawings incorporates the novel feature provided by the present invention of catalytically converting hydrogen under such conditions as to vaporize by the heat of conversion liquefied gas at superatmospheric pressure as described above, in connection with a cycle employing an expansion engine for obtaining more complete utilization of the internal energy of the liquefied gas vaporized by the heat of conversion. As shown, a stream of normal hydrogen at atmospheric temperature and pressure and free of moisture and impurities including traces of oxygen and nitrogen is introduced to the cycle through conduit 50 and merged with a recycled stream of hydrogen vapor at atmospheric pressure having a higher than normal para concentration in a conduit 51, the merged streams being fed to a compressor 52 for compression to a high pressure required to meet the liquefaction requirements. The high pressure hydrogen gas from the compressor is conducted by conduit 53 to pass 54 of a heat exchange device 55 wherein the hydrogen is cooled to a relatively low temperature. The heat exchange device 55 may include a shell 56 containing a pool 57 of liquid refrigerant and vapor zone 58. The liquid refrigerant may be introduced at atmospheric pressure into the heat exchange device through conduit 59 and the vapor zone 58 may be connected by conduit 60 to a region of low pressure. From the cold end of the heat exchange pass 54 the cooled high pressure hydrogen is conducted by conduits 61 to pass 62 of heat exchange device 63 wherein the hydrogen is further cooled in heat exchange relation with the cold fluid streams described below. Thereafter the cooled high pressure hydrogen is expanded in valve 64 to a superatmospheric pressure and introduced in partially liquid phase into a chamber 65 defined by vessel 66. The liquefied hydrogen collects in a pool 67 in the chamber 65 and, in accordance with the principles of the present invention, a catalyst 68 is located in the chamber in intimate contact with the liquid hydrogen in the pool 67 to effect conversion of ortho hydrogen, with vaporization of liquid hydrogen by the heat of conversion, and provide liquid hydrogen of a maximum para concentration determined by the existing temperature. Converted liquid hydrogen is withdrawn from the chamber through conduit 69, conducted through pass 70 of heat exchange device 71, expanded to atmospheric pressure in valve 72 and introduced into liquid receiving chamber 73 of vessel 74 where it collects as a pool 75 from which it may be withdrawn through conduit 76 provided with a control valve 77.

Vapor flashed upon expansion of converted liquid hydrogen from the superatmospheric conversion pressure to atmospheric pressure, which vapor is of high para concentration, is withdrawn from the chamber 73 through conduit 78 and conducted through pass 79 of heat exchange device 71 in countercurrent heat exchange effecting relation with converted liquid hydrogen and then passed in countercurrent heat exchange effecting relation with the high pressure hydrogen gas. As shown, the hydrogen vapor stream from the warm end of the heat exchange device 71 is conducted by conduit 80 to pass 81 of the heat exchange device 63, and then introduced by way of conduit 82 to pass 83 of the heat exchange device 55, the warm end of the pass 83 being connected to the conduit 51.

The refrigeration fluid comprising the unliquified portion of the high pressure hydrogen gas and liquid hydrogen vaporized by the heat of conversion is withdrawn from the chamber 65 through conduit 84 and conducted under the superatmospheric conversion pressure to pass 85 of the heat exchange device 63 for countercurrent heat exchange effecting relation with the high pressure hydrogen gas. Refrigeration fluid is withdrawn from the heat exchange device 63 at a predetermined higher temperature and conducted by conduit 86 to an expansion engine 87 wherein the refrigeration fluid is expanded with work to a lower pressure such as atmospheric pressure. The effluent from the expansion engine in conduit 88 may be conducted through conduit 89 and control valve 90 and merged with the hydrogen vapor of high para concentration in conduit 80, or may be conducted through conduit 91 and control valve 92 for merging with the hydrogen vapor of high para concentration in conduit 78 on the cold side of the heat exchange device 71. There is an optimum temperature at which the hydrogen vapor under the conversion pressure is withdrawn from the heat exchange device 63 in order to obtain maximum refrigeration by the ensuing work expansion. While in FIGURE 2 the expansion engine feed conduit 86 is shown connected to the pass 85 at a certain intermediate point along the length of the heat exchange device 63, it is to be understood that the conduit 82 may be connected to the heat exchange pass 85 at other points along the length of the heat exchange device 63 or the refrigeration fluid may be passed throughout the length of the heat exchange device 63 and then fed to the inlet of the expansion engine 87, in order to obtain the optimum expansion engine inlet temperature. Also, the temperature of the expansion engine effluent will be influenced by operating conditions as understood by those skilled in the art and hence the point of introduction of the effluent to the heat exchange zone may vary for different cycles. In any event it is desired to introduce the effluent in such a manner as to obtain more efficient heat interchange and thus utilize to the fullest extent refrigeration obtained by the expansion step. Thus, as illustrated, the effluent from the expansion engine may be added to the warmed hydrogen vapor of high para concentration entering the cold end of the heat exchange devices 63 or 71. In addition, in some instances it may be desirable to introduce the expansion engine effluent to the pass 79 at an intermediate point along the length of the heat exchange device 71.

In operation of the cycle shown in FIGURE 2, normal hydrogen at atmospheric pressure free of moisture, impurities and condensibles including traces of oxygen and nitrogen, is introduced into the cycle through conduit 50 and merged with a stream of hydrogen vapor of high para concentration in the conduit 51, the combined streams being compressed in the compressor 52 to a relatively high pressure such as 1500 p.s.i.a. for example. The high pressure hydrogen is cooled to about −343° F. upon flowing through pass 54 of the heat exchange device 55, the pool 57 of liquid refrigerant comprising liquid nitrogen boiling at subatmospheric pressure through means of a connection of conduit 60 to a region under 2 p.s.i.a. The cooled high pressure hydrogen is further cooled in the heat exchange device 63 to about −400° F. and expanded to an intermediate pressure of about 80 p.s.i.a. in valve 64 to effect partial liquefaction, the liquid portion collecting in the pool 67 at a temperature of about −410° F. Liquid forming the pool 67 is in intimate contact with the catalyst 68 to accelerate conversion of ortho hydrogen and establish an equilibrium concentration corresponding to −410° F., that is about 96% para hydrogen. The converted liquid is passed by conduit 69 through heat exchange device 71 and expanded in valve 71 to atmospheric pressure and introduced into the liquid receiving chamber 73 at about −422° F.

Upon expansion of converted liquid hydrogen from 80 pounds p.s.i.a. to atmospheric pressure about 17% of the liquid will flash as vapor. Thus, in order to produce 1 mol of hydrogen of 96% para concentration it is necessary to withdraw 1.2 mols of converted liquid from the pool 67. With the hydrogen gas at a pressure of 1500 p.s.i.a. and with a conversion pressure of about 80 p.s.i.a., in order to provide 1.2 mols of converted liquid hydrogen with the refrigeration available it is necessary to expand about 7 mols of high pressure hydrogen through the valve 64. Consequently the refrigeration fluid comprises about 5.8 mols of hydrogen. The refrigeration medium is warmed in pass 85 to about −380° F. and expanded in the engine 87 to atmospheric pressure and cooled to about −410° F. The effluent may be passed through valve 90 and added to the low pressure hydrogen vapor entering the cold end of the heat exchange pass 81. Thus, the stream of hydrogen vapor leaving the warm end of the heat exchange pass 83 and flowing to the conduit 51 comprises about 6 mols and about 1 mol of normal hydrogen is introduced to the cycle through conduit 50.

The cycle shown in FIGURE 2 makes it possible to produce a given quantity of liquid hydrogen of about 96% para concentration at a lower power cost notwithstanding the requirement to compress the total hydrogen, that is, the refrigeration fluid and the hydrogen feed, from atmospheric pressure to the relatively high pressure required to effect the necessary liquefaction. This results since additional refrigeration is obtained upon operation of the expansion engine 87. The latter operation is made possible by the feature of the present invention of catalytically converting the hydrogen feed under such conditions so that the heat of conversion vaporizes liquefied gas under superatmospheric pressure, the pressure of the vaporized liquefied gas falling within a pressure range adequate for subsequent work expansion to atmospheric pressure. While the refrigeration obtained by expanding the refrigeration fluid at conversion pressure in the expansion engine 87 increases as the conversion pressure approaches the critical pressure of hydrogen, practical operating conversion pressures fall within the range of 60 p.s.i.a. to 130 p.s.i.a. for reasons similar to those discussed above in connection with the cycle shown in FIGURE 1. It is to be understood that features of the cycles shown in FIGURES 1 and 2 may be combined to provide different cycles which may be preferred under certain operating conditions. In particular, a part of the refrigeration fluid withdrawn from the catalytic zone under superatmospheric pressure may be passed in countercurrent heat exchange effecting relation with the high pressure hydrogen gas and warmed to ambient temperature and then compressed from the conversion pressure to the high pressure and recirculated in the cycle in accordance with the arrangement shown in FIGURE 1, while the remaining part of the refrigeration fluid withdrawn from the catalytic zone may be warmed and then expanded with work with the effluent being merged with the countercurrent flowing low pressure hydrogen vapor of high para concentration according to the arrangement of FIGURE 2.

The liquefaction and conversion cycle shown in FIGURE 3 of the drawings includes novel features discussed above in connection with the embodiment of the invention shown in FIGURE 1 together with other novel arrangements and features which make it possible to obtain still greater power savings and to convert hydrogen under any desired pressure. As shown, a stream of normal hydrogen at atmospheric pressure free of moisture, impurities and condensibles including particles of oxygen and nitrogen is introduced into the cycle through conduit 100 and merged with a stream of hydrogen vapor of high para concentration in conduit 101, the latter stream being at atmospheric temperature and pressure and being derived from the cycle in a manner described below. The merged streams comprise the hydrogen feed and are conducted through conduit 102 to a compressor 103 for increasing the hydrogen feed to any desired pressure within the range of about 60 p.s.i.a. to 1500 p.s.i.a. The compressed hydrogen feed is conducted by conduit 104 to pass 105 of the heat exchange device 106. The heat exchange device 106 may include a shell 107 containing a pool 108 of liquid refrigerant, such as liquid nitrogen, supplied thereto through conduit 109, the vapor space 110 formed by the shell being connectable through conduit 111 to a region of low pressure, about 2 p.s.i.a., for example, to cause the liquid nitrogen to boil under vacuum and thereby cool the hydrogen feed emerging from the pass 105 to about −343° F. From the pass 105 the cooled hydrogen feed is conducted by conduit 112 to a vessel 113 enclosing a suitable catalyst 114 for effecting conversion of ortho hydrogen to para hydrogen. At the temperature of about −343° F. the hydrogen feed may be converted to an equilibrium concentration of about 50% to 55% para hydrogen and the partially converted hydrogen feed is conducted by conduit 115 to pass 116 of the heat exchange device 106 where the heat of conversion is removed and the partially converted hydrogen feed cooled to about −343° F. The partially converted hydrogen feed is then conducted by conduit 117 through pass 118 of heat exchange device 119 in countercurrent heat exchange effecting relation with cold fluids as described below and thereby further cooled to about −387° F. From the pass 118 the hydrogen feed is conducted by conduit 120 to a catalytic conversion coil 121 immersed in a pool 122 of liquid refrigerant, such as hydrogen, contained in a vessel 123. If desired an expansion valve 123A may be included in the conduit 120 to expand the hydrogen feed to a lower superatmospheric pressure prior to conversion in vessel 123. As will be described more fully below, liquid hydrogen in pool 122 is under a superatmospheric pressure, of about 80 p.s.i.a. for example, to cool the hydrogen feed flowing through the coil 121 to about −410° F. As shown in FIGURE 4, the coil 121 may be of helical form enclosing suitable catalytic material 124 in small particles, to accelerate conversion of ortho hydrogen. A screen 125 is positioned at the downstream end of the coil 121 to prevent passage of particles of the catalytic material therefrom. The hydrogen feed flowing through the coil 121 contacts the catalytic material 124 and is converted to establish a para hydrogen composition which may approach the para hydrogen equilibrium composition corresponding to the existing temperature. The converted hydrogen feed from the coil 121 is conducted by conduit 126 through pass 127 of heat exchange device 128 in countercurrent heat exchange effecting relation with cold hydrogen described below, and then expanded in valve 129 to any desired pressure, such as atmospheric pressure, for example, with the effluent from the expansion valve being introduced into a vessel 130 where it collects in a pool 131 from which liquid hydrogen of high para concentration may be withdrawn through conduit 132 having a control valve 133. Expansion of the converted hydrogen liquid from the superatmospheric conversion pressure to atmospheric pressure in the valve 129 results in the flashing of hydrogen vapor of high para concentration which is withdrawn from the vessel 130 through conduit 134, conducted through pass 135 of the heat exchange device 128 in countercurrent heat exchange relation with the converted hydrogen liquid and then conducted by conduit 136 through pass 137 of the heat exchange device 119 in countercurrent heat exchange effecting relation with the hydrogen feed and a refrigeration fluid described below. The hydrogen vapor of high para concentration is then conducted by conduit 138 to pass 140 of the heat exchange device 106 from which it emerges at substantially atmospheric temperature and is conducted by conduit 101 to the inlet of the compressor 103 as described above.

The pool 122 of liquid refrigerant surrounding the catalytic conversion coil 121 in the vessel 123 is provided by a system utilizing a refrigeration fluid which is segregated from the hydrogen feed. As shown, a compressor 145 delivers a stream of refrigerant, such as hydrogen gas under a pressure of about 1500 p.s.i.a., which is conducted by conduit 146 to pass 147 of the heat exchange device 106 wherein the high pressure hydrogen refrigeration stream is cooled to about $-343°$ F. in heat exchange effecting relation with the liquid nitrogen boiling under vacuum. The cooled refrigeration fluid is conducted by conduit 148 to pass 149 of the heat exchange device 119 wherein it is further cooled to about $-387°$ F. in countercurrent heat exchange effecting relation with cold fluid streams including hydrogen vapor of high para concentration flowing through the pass 137. The refrigeration fluid is then expanded in valve 150 to an intermediate pressure slightly less than the hydrogen feed pressure, for example less than 80 p.s.i.a., and introduced into the vessel 123 partially in liquid phase. The liquefied portion collects in the pool 122 surrounding the catalytic conversion coil 121 to reduce the temperature of the hydrogen feed to about $-410°$ F. and effect conversion of ortho hydrogen to establish an equilibrium composition as high as 96% para hydrogen as described above. Hydrogen vapor comprising the unliquefied portion of the refrigeration fluid as well as liquid hydrogen vaporized by the heat of conversion is withdrawn from the vessel 123 through condut 151 at a temperature of about $-410°$ F. and conducted to pass 152 of the heat exchange device 119 in countercurrent heat exchange effecting relation with the high pressure refrigeration fluid and the hydrogen feed flowing through passes 149 and 118, respectively. The hydrogen vapor at the intermediate pressure emerges from the path 152 at the warm end of the heat exchange device 119 at about $-345°$ F. and is conducted by conduit 153 to pass 154 of the heat exchange device 106 for further countercurrent heat exchange effecting relation with the high pressure refrigeration fluid and the hydrogen feed. The refrigeration fluid at the intermediate pressure leaves the warm end of the heat exchange device 106 at substantially atmospheric temperature and is conducted by conduit 155 to the inlet of the compressor 145 wherein it is compressed to the high pressure and recycled in the refrigeration system.

In operation of the cycle shown in FIGURE 3 with the hydrogen feed at about 100 p.s.i.a. in order to produce 1 mol of liquid hydrogen of 96% para concentration it is necessary to compress about 1.2 mols of hydrogen feed in the compressor 103 inasmuch as upon expansion from 100 p.s.i.a. to atmospheric pressure in the valve 129 approximately .2 mol will flash into vapor. The latter vapor is conducted through conduit 134 and passes 135, 137 and 140 of the heat exchange devices 128, 119 and 106 and is merged with 1 mol of normal hydrogen introduced by the conduit 100 and fed to the hydrogen feed compressor 103. In order to provide adequate refrigeration at an intermediate pressure of 80 p.s.i.a. and effect conversion of hydrogen feed to about 96% para hydrogen in the coil 121 it is necessary to circulate about 5.4 mols of hydrogen through the closed refrigeration cycle, with the hydrogen being compressed to about 1500 p.s.i.a. The feature of converting in the vessel 113 the hydrogen feed while in gaseous phase to about 50% para hydrogen results in a substantial saving in power since only about 5.4 mols are required to be compressed from the intermediate pressure to a high pressure of 1500 p.s.i.a. whereas in the cycle shown in FIGURE 1, 6.4 mols are required to be so compressed.

In accordance with another embodiment of the present invention liquefied neon is vaporized by the heat generated upon catalytic conversion of ortho hydrogen to para hydrogen and the internal energy of vaporized liquid neon is utilized to provide a part of the power requirements. In this embodiment, with reference to the cycle shown in FIGURE 3 of the drawings, neon comprises the refrigeration fluid and is compressed in compressor 145 to any suitable superatmospheric pressure, such as 1500 p.s.i.a. for example, cooled upon flowing through passes 147 and 139 to heat exchange devices 106 and 119, respectively, expanded in valve 150 to any desired pressure below 395 p.s.i.a. the critical pressure of neon, and then introduced into the chamber 122 partly in liquid phase. Neon in gaseous phase comprising unliquefied neon entering the chamber 122 and liquefied neon vaporized by the heat generated by conversion of ortho hydrogen to para hydrogen in the coil 121, is withdrawn from the chamber 151, warmed upon flowing through passes 152 and 154 of heat exchange devices 119 and 106, respectively, and introduced at substantially ambient temperature to the inlet of compressor for recirculation in the refrigeration cycle. It is to be understood the efficiency of the neon refrigeration cycle may be increased by the use of arrangements well known in the art, such as by the use of an expansion engine, for example.

The use of neon as the refrigeration fluid and the use of liquefied neon as the absorbent of the heat of ortho hydrogen conversion makes it possible to obtain still greater power savings. This results from several factors as discussed below. The latent heat of vaporization of neon at atmospheric pressure is 792 B.t.u./lb. mol. which is over twice the heat of vaporization of hydrogen at its normal boiling point and greater than the heat of conversion of normal hydrogen to 100% para hydrogen at about $-422°$ F. Thus, upon conversion of equal masses of hydrogen to the same para hydrogen concentration the quantity of liquefied neon vaporized by the heat of conversion will be less than one-half the quantity of liquid hydrogen that would be vaporized. Since the additional cost of high para hydrogen as compared to liquefied normal hydrogen results for the most part from the liquid loss due to the heat of conversion, the feature of vaporizing liquefied neon under superatmospheric pressure by the heat of conversion results in a thermal power savings of about 40% to 50% as compared to prior cycles where catalytic conversion of ortho hydrogen to para hydrogen is achieved at atmospheric pressure. A further power saving may be achieved when utilizing neon since the hydrogen may be catalytically converted at pressures approaching its critical pressure. Moreover, a refrigeration cycle employing neon as the refrigeration fluid is more efficient than a cycle employing hydrogen due to the Joule-Thompson coefficients of these gases.

As discussed above, the para hydrogen equilibrium concentration of liquid hydrogen increases with temperature and that about 100% para hydrogen exists at the boiling point of hydrogen under atmospheric pressure. The feature of the present invention of effecting catalytic conversion of ortho hydrogen to para hydrogen under such conditions as to effect vaporization of liquefied hydrogen or neon under superatmospheric pressure necessarily results in ortho hydrogen conversion at temperature levels above the equilibrium temperature of 100% para hydrogen. However, this is not disadvantageous since liquid hydrogen having para hydrogen concentrations substantially less than 100% is adequate for efficient storage. In view of the relatively small percentage of liquid lost upon storage of liquid hydrogen having an initial ortho hydrogen concentration of 15% or lower, and since the liquid vaporized during the autogenous conversion is recirculated in the cycle it is not usually feasible to attempt to provide for storage 100% liquid para hydrogen, nor is it necessary to operate cycles embodying the principles of the present invention in such a manner as to produce liquid hydrogen having the maximum obtainable para hydrogen concentration, of the order of 95% to 97%, for example, unless such high para hydrogen concentrations are desired because of special uses or storage problems. The ideal para concentration for storage depends on a number of factors including the storage period and the thermal efficiency of the storage vessel. Moreover, there is a saving in power as the para concentration of the product decreases while losses due to autogenous conversion in storage increase as the para concentration of the product decreases. It has been determined that in some cases, while considering the loss due to autogenous conversion in storage and the increase in production by not converting to the maximum para concentration, that a para concentration of the order of 88% is an optimum.

In connection with the foregoing it should be understood that the vessels 47, 74 and 130, of FIGURES 1, 2 and 3, respectively, may be considered as product storage vessels and that the liquids therein are vaporized in part, by the heat of autogenous conversion and by heat entering through the walls of the vessels, with the resulting hydrogen vapors being withdrawn through conduits 51, 78 and 134, respectively, for recirculation in the cycle. It should also be understood outlet conduits 49, 76 and 132 may be fed to separate storage vessels having connection for vapor with conduits 51, 78 and 134, respectively. With this arrangement the total energy of vapor withdrawn from the storage vessel may be utilized to decrease the power requirements of the cycle. Also the power requirements may be further reduced by adding vapor withdrawn from the storage vessel, which vapor is of high para concentration, to the hydrogen feed and thereby increase the para concentration of the hydrogen subjected to catalytic conversion.

In installations where a substantial distance may exist between the hydrogen liquefier and the storage vessel a further power saving may be obtained by warming vapor withdrawn from the storage vessel by heat exchange with a fluid under a higher pressure that is recirculated in the liquefaction cycle. In particular, vapor may be withdrawn from the storage vessel at atmospheric pressure or low super-atmospheric pressure, passed in heat exchange effecting relation with a fluid under higher pressure and warmed to ambient temperature. A warm transmission line may then be employed for conducting warmed vapor to the liquefier to form a part of the hydrogen feed. The fluid under high pressure may comprise hydrogen feed or refrigeration fluid, withdrawn from the liquefaction cycle and returned thereto at the proper temperature levels. For example, in FIGURE 1, conduit 49 conducts converted liquid hydrogen to a storage vessel, not shown, located a substantial distance from the liquefier. Hydrogen vapor withdrawn from the storage vessel is passed in heat exchange with refrigeration fluid under the intermediate pressure and thereby warmed to ambient temperature. Warmed hydrogen vapor is then conducted in a warm transmission line for merging with conduit 11, the high para concentration of the warmed hydrogen vapor increasing the para concentration of the hydrogen feed. The stream of hydrogen vapor under the intermediate pressure is withdrawn from the liquefaction cycle by a branched connection with conduit 15, passed in countercurrent heat exchange relation with hydrogen vapor from the storage vessel, and then conducted by a cold transmission line and merged, after expansion, with hydrogen vapor in conduit 51 or at any other point in the cycle at the proper temperature level. Since the hydrogen vapor is under the intermediate pressure it may be conducted through elongated transmission lines with less vapor loss.

Thus, the conversion cycles shown and described above are operable to produce converted liquid hydrogen adequate for efficient storage by catalytically converting liquid hydrogen to establish a para hydrogen concentration of 85% to 97%. The percentage of para hydrogen concentration obtained by catalytic conversion will correspond to the temperature of the liquid hydrogen when in contact with the catalyst providing the hydrogen is maintained in contact with the catalyst a period of time sufficient to obtain complete conversion. When it is desired to produce liquid hydrogen of para hydrogen concentrations less than the maximum obtainable, the residence time of the hydrogen liquid may be decreased or a portion of the hydrogen liquid may be caused to by-pass the catalytic treating zone.

There is thus provided by the present invention novel methods of an apparatus for producing hydrogen of high para hydrogen concentrations with material savings in total cost per mol of product as compared to prior cycles. In accordance with the principles of the present invention the heat released upon catalytic conversion of ortho hydrogen to para hydrogen is dissipated by vaporizing liquefied gas under such conditions as to produce a fluid possessing relatively high internal energy which is utilized to reduce the power requirements of the cycle. The hydrogen may be catalytically converted in liquid phase or under a pressure above the critical pressure of hydrogen and the liquefied gas vaporized by the heat of conversion may be under an optimum superatmospheric pressure. The hydrogen feed may be catalytically converted in direct or indirect heat exchange effecting relation with the liquefied gas, that is, a single stream of hydrogen gas may be fed to the cycle, expanded and partly liquefied and introduced into a zone housing a catalyst with a part of the liquid, the hydrogen feed, being converted and another part being vaporized by the heat of conversion and being recirculated as a part of the refrigeration fluid, or the hydrogen feed may be passed in contact with a catalyst in a zone located in indirect heat exchange effecting relation with liquefied gas which is segregated with respect to the hydrogen feed and may be considered the refrigeration fluid of the cycle, the liquefied gas comprising hydrogen or neon. Moreover, the internal energy of the fluid produced upon dissipation of the heat of ortho hydrogen conversion may be utilized to reduce the power requirements of the cycle by reducing the work of compression or by producing additional refrigeration or by a combination of both.

Although several embodiments of the invention have been disclosed and described herein it is to be expressly understood that various changes and substitutions may be made therein without departing from the spirit of the invention as well understood by those skilled in the art. For example, although for the sake of simplicity the cycles shown in the drawings have been described as being fed with normal hydrogen free of moisture, impurities and condensibles including oxygen and nitrogen, it is to be understood that suitable oxygen, nitrogen, carbon monoxide, methane and carbon dioxide adsorbers, such as vessels containing silica gel, for example, may be included at appropriate temperature level in the cycle, such as in conduit 19 of FIGURE 1, for effecting removal of oxygen and nitrogen. Therefore, reference will be

I claim:

1. Method of producing hydrogen of high para concentration which comprises the steps of cooling hydrogen to a low temperature, providing a source of liquefied gas under superatmospheric pressure, catalytically treating cooled hydrogen to accelerate conversion of ortho hydrogen to para hydrogen and establish a high para hydrogen concentration, vaporizing liquefied gas under superatmospheric pressure by heat generated from the conversion, and providing a portion of the power required to cool the hydrogen to the low temperature from the energy of vaporized liquefied gas produced during the vaporizing step.

2. Method of producing hydrogen of high para concentration which comprises the steps of cooling compressed hydrogen to a low temperature, catalytically treating compressed and cooled hydrogen to accelerate conversion of ortho hydrogen to para hydrogen and establish a high para hydrogen concentration, vaporizing liquefied gas under superatmospheric pressure with heat generated by conversion of ortho hydrogen, utilizing total energy of vaporized liquefied gas produced during the vaporizing step to provide a portion of the power required to cool the hydrogen to the low temperature, expanding converted hydrogen to a lower pressure, and providing a portion of the power required to cool the hydrogen to the low temperature from the energy of vapor flashed during the expansion step.

3. Method of producing liquid hydrogen of high para concentration which comprises cooling a stream of compressed hydrogen and expanding the cooled stream to a lower superatmospheric pressure to partly liquefy the hydrogen, introducing liquid hydrogen into a catalytic treating zone to accelerate conversion of ortho hydrogen to para hydrogen and vaporize liquefied hydrogen by the heat of conversion, withdrawing hydrogen vapor from the zone, and providing a portion of the power required for liquefying hydrogen from the energy of withdrawn hydrogen vapor.

4. Method of producing liquid hydrogen of high para concentration which comprises cooling a stream of hydrogen compressed to a relatively high pressure and expanding the cooled stream to a lower pressure to provide liquefied hydrogen, catalytically treating liquefied hydrogen to accelerate conversion of ortho hydrogen to para hydrogen and vaporize liquefied hydrogen under superatmospheric pressure by the heat of conversion, providing a portion of the power required for liquefying hydrogen from the energy of vaporized liquefied hydrogen under superatmospheric pressure, expanding converted liquefied hydrogen to a still lower pressure, and providing a portion of the power required for liquefying hydrogen from the energy of hydrogen vapor flashed during the last-named expansion step.

5. Method of producing liquid hydrogen of high para concentration which comprises cooling a stream of hydrogen compressed to a relatively high pressure and expanding the cooled stream to a lower pressure to provide liquefied hydrogen, catalytically treating liquefied hydrogen to accelerate conversion of ortho hydrogen to para hydrogen and vaporize liquefied hydrogen under superatmospheric pressure by the heat of conversion, providing a portion of the power required for liquefying hydrogen from the energy of vaporized liquefied hydrogen under superatmospheric pressure, subcooling converted liquefied hydrogen, expanding converted liquefied hydrogen to a still lower pressure, and providing a portion of the power required for liquefying the hydrogen from the energy of hydrogen vapor flashed during the last-named expansion step.

6. Method of producing liquid hydrogen of high para concentration which comprises providing a stream of compressed hydrogen, cooling the stream of compressed hydrogen, providing a source of liquefied gas under superatmospheric pressure, catalytically treating cooled hydrogen to accelerate conversion of ortho hydrogen to para hydrogen and establish a high para hydrogen concentration, vaporizing liquefied gas under superatmospheric pressure by the heat of the conversion, passing vaporized liquefied gas under superatmospheric pressure in countercurrent heat exchange effecting relation with compressed hydrogen, and utilizing vaporized liquefied gas in providing the source of liquefied gas.

7. Method of producing a liquid hydrogen of high para concentration which comprises providing a stream of hydrogen compressed to a relatively high pressure, cooling the stream of compressed hydrogen, expanding the cooled stream to a lower superatmospheric pressure and providing liquid hydrogen, introducing liquid hydrogen under superatmospheric pressure into a catalytic treating zone for accelerating conversion of ortho hydrogen to para hydrogen to provide liquid hydrogen of high para concentration while vaporizing liquid hydrogen by the heat of conversion, withdrawing hydrogen vapor from the zone, passing withdrawn vapor in countercurrent heat exchange effecting relation with compressed hydrogen and utilizing hydrogen vapor in providing the stream of hydrogen compressed to the relatively high pressure.

8. Method of producing liquid hydrogen of high para concentration which comprises providing a stream of hydrogen compressed to a relatively high pressure, cooling the stream of compressed hydrogen, expanding the cooled stream to a first lower superatmospheric pressure and partially liquefying the hydrogen stream, feeding liquid hydrogen under superatmospheric pressure to a catalytic treating zone to accelerate conversion of ortho hydrogen to para hydrogen and provide liquid hydrogen of high para hydrogen concentration while vaporizing liquid hydrogen by the heat of conversion, withdrawing hydrogen vapor from the zone, passing withdrawn hydrogen vapor in countercurrent heat exchange effecting relation with compressed hydrogen, utilizing withdrawn hydrogen vapor in providing the stream of compressed hydrogen, withdrawing converted liquid hydrogen from the zone, expanding withdrawn converted hydrogen to a lower pressure, passing vapor flashed during the last-named expansion step in countercurrent heat exchange effecting relation with compressed hydrogen and utilizing flashed hydrogen vapor in providing the stream of compressed hydrogen.

9. Method of producing liquid hydrogen of high para concentration which comprises compressing a stream of hydrogen to a relatively high pressure, cooling compressed hydrogen, feeding cooled hydrogen to a catalytic treating zone to accelerate conversion of ortho hydrogen to para hydrogen and establish a high para composition, vaporizing liquefied gas under superatmospheric pressure by the heat of conversion, expanding vaporized liquefied gas to a lower pressure with the production of external work, and passing effluent of the work expansion step in heat exchange effecting relation with compressed hydrogen.

10. Method of producing liquid hydrogen of high para concentration which comprises compressing a stream of hydrogen to a relatively high pressure, cooling compressed hydrogen, expanding cooled hydrogen to a lower superatmospheric pressure and partially liquefying hydrogen, feeding liquefied hydrogen to a catalytic treating zone to accelerate conversion of ortho hydrogen to para hydrogen and establish a high para hydrogen concentration, vaporizing liquefied hydrogen under superatmospheric pressure by the heat of conversion, passing vaporized liquefied hydrogen under superatmospheric pressure in heat exchange relation with compressed hydrogen to warm the vaporized liquefied hydrogen, expanding warmed vaporized liquefied hydrogen with production of external work, and passing effluent of the work expansion step in heat exchange with compressed hydrogen.

11. Method of producing hydrogen of high para concentration which comprises cooling a stream of compressed gas, expanding cooled compressed gas to a superatmospheric pressure and providing liquefied gas under superatmospheric pressure, providing a stream of cooled hydrogen, catalytically treating cooled hydrogen to accelerate conversion of ortho hydrogen to para hydrogen and establish a high para hydrogen concentration, vaporizing liquefied gas under superatmospheric pressure by the heat of conversion, and providing a portion of the power required for cooling hydrogen and compressed gas from the energy of vaporized liquefied gas.

12. Method of producing hydrogen of high para concentration which comprises cooling a stream of compressed gas, expanding cooled compressed gas to a superatmospheric pressure and partly liquefying the gas, providing a stream of cooled hydrogen, catalytically treating cooled hydrogen to accelerate conversion of ortho hydrogen to para hydrogen and establish a high para hydrogen concentration, vaporizing liquefied gas under superatmospheric pressure by the heat of conversion, passing vaporized liquefied gas in countercurrent heat exchange effecting relation with the hydrogen stream and compressed gas and then utilizing vaporized liquefied gas to form the stream of compressed gas.

13. Method of producing hydrogen of high para concentration as defined in claim 12 in which the compressed gas comprises hydrogen.

14. Method of producing liquid hydrogen of high para concentration as defined in claim 12 in which the compressed gas comprises neon.

15. Method of producing hydrogen of high para concentration which comprises cooling a stream of compressed gas, expanding cooled compressed gas to a superatmospheric pressure and partly liquefying the gas, introducing liquefied gas into a receiving zone, withdrawing vapor from the receiving zone, passing withdrawn vapor in countercurrent heat exchange relation with compressed gas and then utilizing withdrawn vapor in providing the stream of compressed gas, passing a stream of compressed hydrogen in countercurrent heat exchange effecting relation with withdrawn vapor to cool the hydrogen, catalytically treating cooled hydrogen to accelerate conversion of ortho hydrogen to para hydrogen and establish a high para hydrogen concentration and transferring the heat of conversion to the liquefied gas in the zone to effect vaporization of liquefied gas, withdrawing converted hydrogen from the zone, expanding converted hydrogen to a lower pressure, and passing vapor flashed in the last-named expansion step in countercurrent heat exchange relation with compressed gas and compressed hydrogen.

16. Method of producing hydrogen of high para concentration which comprises cooling a stream of compressed gas, expanding cooled compressed gas to a superatmospheric pressure and partly liquefying the gas, introducing liquefied gas into a receiving zone, withdrawing vapor from the receiving zone, passing withdrawn vapor in countercurrent heat exchange relation with compressed gas and then utilizing withdrawn vapor in providing the stream of compressed gas, passing a stream of compressed hydrogen in countercurrent heat exchange effecting relation with withdrawn vapor to cool the hydrogen, expanding cooled hydrogen to a lower pressure, catalytically treating expanded hydrogen in heat exchange effecting relation with liquefied gas in the zone to accelerate conversion of ortho hydrogen to para hydrogen and establish a high para hydrogen concentration while vaporizing liquefied gas by the heat of conversion, withdrawing converted hydrogen from the zone, expanding converted hydrogen to a lower pressure, and passing vapor flashed in the last-named expansion step in countercurrent heat exchange relation with compressed gas and compressed hydrogen.

17. Method of producing hydrogen of high para concentration which comprises cooling a stream of compressed gas, expanding cooled compressed gas to a superatmospheric pressure and partly liquefying the gas, introducing liquefied gas into a receiving zone, withdrawing vapor from the receiving zone, passing withdrawn vapor in countercurrent heat exchange relation with compressed gas and then utilizing withdrawn vapor in providing the stream of compressed gas, passing a stream of compressed hydrogen in countercurrent heat exchange effecting relation with withdrawn vapor to cool the hydrogen, catalytically treating cooled hydrogen in heat exchange effecting relation with liquefied gas in the zone to accelerate conversion of ortho hydrogen to para hydrogen and establish a high para hydrogen concentration while vaporizing liquefied gas by the heat of conversion, withdrawing converted hydrogen from the zone subcooling withdrawn hydrogen, expanding subcooled hydrogen to a lower pressure, and passing vapor flashed in the last-named expansion step in countercurrent heat exchange relation with compressed gas and compressed hydrogen.

18. Method of producing liquid hydrogen of high para concentration as defined in claim 15 in which hydrogen vapor following the heat exchange step with compressed gas and compressed hydrogen is used in forming the compressed hydrogen.

19. Method of producing hydrogen of high para concentration which comprises cooling hydrogen to a low temperature, catalytically treating cooled hydrogen to accelerate conversion of ortho hydrogen to para hydrogen and establish a high para hydrogen concentration, vaporizing liquefied gas under superatmospheric pressure with heat generated by conversion of ortho hydrogen, providing a portion of the power required for cooling the hydrogen from the energy of vaporized liquefied gas under superatmospheric pressure, the liquefied gas being under a pressure between about 60 p.s.i.a. and 130 p.s.i.a.

20. Method of producing hydrogen of high para concentration which comprises cooling hydrogen to a low temperature, catalytically treating cooled hydrogen to accelerate conversion of ortho hydrogen to para hydrogen and establish a high para hydrogen concentration, vaporizing liquefied gas under superatmospheric pressure with heat generated by conversion of ortho hydrogen, providing a portion of the power required for cooling the hydrogen from the energy of vaporized liquefied gas under superatmospheric pressure, the liquefied gas being under a pressure between about 80 p.s.i.a. and 110 p.s.i.a.

21. Apparatus for producing liquid hydrogen of high para concentration comprising compressor means, a heat exchanger including a plurality of passageways, a vessel defining a zone, means for supporting a catalyst for intimate contact with liquid hydrogen and in heat interchange with the zone, the catalyst being of the type for accelerating the conversion of ortho hydrogen to para hydrogen, first conduit means connecting the compressor means through a first passageway of the heat exchanger to the vessel, an expansion valve in the first conduit means, second conduit means connecting the vessel through a second passageway of the heat exchanger to an inlet to the compressor means, means for maintaining the vessel under superatmospheric pressure, and an outlet means for converted liquid hydrogen in communication with the catalyst.

22. Apparatus for producing liquid hydrogen of high para concentration comprising compressor means including a high pressure and low pressure inlet, a heat exchanger including a plurality of passageways, a first vessel, a catalyst for accelerating the conversion of ortho hydrogen to para hydrogen located in the first vessel, first conduit means connecting the compressor means through a first passageway of the heat exchanger to the first vessel, an expansion valve in first conduit means, second conduit means connecting the first vessel through a second passageway of the heat exchanger to a high pressure inlet of the compressor means, means for maintaining the first vessel under superatmospheric pressure, a second vessel, third conduit means including an expansion valve connecting the first vessel and the second vessel, and fourth conduit means connecting the second vessel through a third passageway of the heat exchanger to a low pressure inlet of the compressor means.

23. Apparatus for producing liquid hydrogen of high para concentration comprising compressor means, a heat exchanger including a plurality of passageways, a vessel defining a zone, a work expansion engine, means for supporting a catalyst for intimate contact with liquid hydrogen and in heat interchange with the zone, the catalyst being of the type for accelerating conversion of ortho hydrogen to para hydrogen, first conduit means connecting the compressor means through a first passageway of the heat exchanger to the vessel, an expansion valve in the first conduit means, second conduit means connecting the vessel through a second passageway of the heat exchanger to the work expansion engine, third conduit means connecting the outlet of the work expansion engine through a third passageway of the heat exchanger to an inlet of the compressor means, means for maintaining the vessel under superatmospheric pressure, and outlet means for converted liquid hydrogen in communication with the catalyst.

24. Apparatus for producing liquid hydrogen of high para concentration comprising first and second compressor means, a heat exchanger including a plurality of passageways, a first vessel, enclosure means located within the first vessel containing a catalyst for accelerating the conversion of ortho hydrogen to para hydrogen, first conduit means connecting the first compressor means through a first passageway of the heat exchanger to the first vessel, an expansion valve in the first conduit means, second conduit means connecting the first vessel through a second passageway of the heat exchanger to an inlet of the first compressor means, means for maintaining the first vessel under superatmospheric pressure, a second vessel, third conduit means connecting the second compressor means through a third passageway of the heat exchanger and through the enclosure means to the second vessel, an expansion valve in the third conduit means, fourth conduit means connecting the second vessel through a fourth passageway of the heat exchanger to an inlet of the second compressor means, and an outlet connected to the second vessel.

References Cited in the file of this patent

UNITED STATES PATENTS

| | | |
|---|---|---|
| 1,574,119 | Seldgmann | Feb. 23, 1926 |
| 2,937,076 | Class et al. | May 17, 1960 |

OTHER REFERENCES

Perry: "Chemical Engineers Handbook," 3rd Edition, pages 1701–1717 (1950).

Weitzel et al.: "Review of Scientific Instruments," vol. 27, pages 57, 58 (1956).

Weitzel et al.: "J. of Research, U.S. Bureau of Standards," vol. 60, pages 221–227, March 1958.

Hood et al.: "Review of Scientific Instruments," vol. 23, pages 357–361 (July 1952).

Perry: "Chemical Engineers Handbook," 2nd Edition, pages 2626, 2635–2638 (1941).

Coplen: "F. of the American Rocket Society," vol. 22, No. 6, pages 309–322, November-December 1952.

Grilley: "Review of Scientific Instruments," vol. 24, pages 1–4, January 1953, pages 899, 900, October 1953.